(12) United States Patent
Sylvia

(10) Patent No.: US 6,293,028 B1
(45) Date of Patent: Sep. 25, 2001

(54) CONSTRUCTION TOOL AND METHOD OF USE

(76) Inventor: Lance Sylvia, 6290 Momouth Ave., Goleta, CA (US) 93117

(*) Notice: Subject to any disclaimer, the term of this patent is extended or adjusted under 35 U.S.C. 154(b) by 0 days.

(21) Appl. No.: 09/207,312

(22) Filed: Dec. 7, 1998

(51) Int. Cl.$^7$ .................................................. G01B 5/14
(52) U.S. Cl. .............................. 33/613; 33/416; 33/417; 33/423; 33/464
(58) Field of Search .............................. 33/415, 416, 417, 33/613, 645, 809, 464, 474, 485, 562, 494, 679.1, 421, 423, 424, 425, 426, 467, 471

(56) References Cited

U.S. PATENT DOCUMENTS

| | | | |
|---|---|---|---|
| 307,321 | * 10/1884 | Osborn | 33/464 |
| 1,007,539 | * 10/1911 | Criss | 33/417 |
| 1,298,995 | * 1/1919 | Michalovitz | 33/464 |
| 1,394,298 | * 10/1921 | Foore | 33/417 |
| 2,245,646 | * 7/1941 | Bullivant | 33/809 |
| 2,624,944 | * 1/1953 | Pujda | 33/613 |
| 2,806,495 | * 9/1957 | Merkle et al. | 33/613 |
| 2,952,076 | * 9/1960 | Gross | 33/827 |
| 3,161,964 | * 12/1964 | Myles | 33/809 |
| 3,169,320 | 2/1965 | Currie . | |
| 3,371,423 | * 3/1968 | Paul | 33/613 |
| 3,635,396 | * 1/1972 | Palfi | 235/70 R |
| 3,851,868 | * 12/1974 | Lagasse | 269/8 |
| 4,212,108 | * 7/1980 | Jackson | 33/501 |
| 4,241,510 | * 12/1980 | Radecki | 33/613 |
| 4,462,166 | * 7/1984 | Furlong | 33/416 |
| 4,527,337 | 7/1985 | Dreiling . | |
| 4,607,438 | 8/1986 | DeFrange . | |
| 4,999,921 | * 3/1991 | Brid et al. | 33/388 |
| 5,083,380 | * 1/1992 | Robertson | 33/562 |
| 5,129,153 | * 7/1992 | Burns, Sr. | 33/613 |
| 5,253,426 | * 10/1993 | Monsbrucker | 33/429 |
| 5,367,783 | * 11/1994 | Nygren | 33/613 |
| 5,535,523 | * 7/1996 | Endris | 33/371 |
| 5,628,119 | * 5/1997 | Bingham et al. | 33/613 |
| 5,768,793 | 6/1998 | Fields . | |
| 5,915,810 | * 6/1999 | Cameron | 33/809 |
| 5,937,531 | * 8/1999 | Menk et al. | 33/613 |

* cited by examiner

*Primary Examiner*—Diego Gutierrez
*Assistant Examiner*—Lydia M. DeJesús
(74) *Attorney, Agent, or Firm*—Leo F. Costello

(57) ABSTRACT

A construction tool and method for its use in laying out stud marks. The tool is adjustable and is especially suited for laying out stud marks on a rafter of a pitched roof so as to be aligned with the corresponding stud marks on a sill beneath the rafter. The tool includes an elongated measuring member; stud-marking members attached to the measuring member in spaced, transverse relation therealong, at least one of the marking members being adjustable along the measuring member; measurement indicia on the measuring member that enables the spacing between the marking members to be set; and conversion indicia on one or more of the members that sets forth the relationship among various roof rises and stud spacings on sills and rafters. The method involves laying out markings on the sill and rafter boards with the tool including the steps of placing the layout tool along a first of the boards, e.g., either a sill or a rafter, with the marking members in a first predetermined spaced relation to each other depending on the desired spacing between marks to be made along the first board; marking the first board with marks at the locations of each of the marking members; adjusting the spacing between the marking members to a second predetermined spaced relation to each other depending on the desired spacing between marks to be made along the second board; and marking the second board, e.g., either the sill or the rafter depending on which board was first marked, with marks at the adjusted locations of each of the marking members.

27 Claims, 4 Drawing Sheets

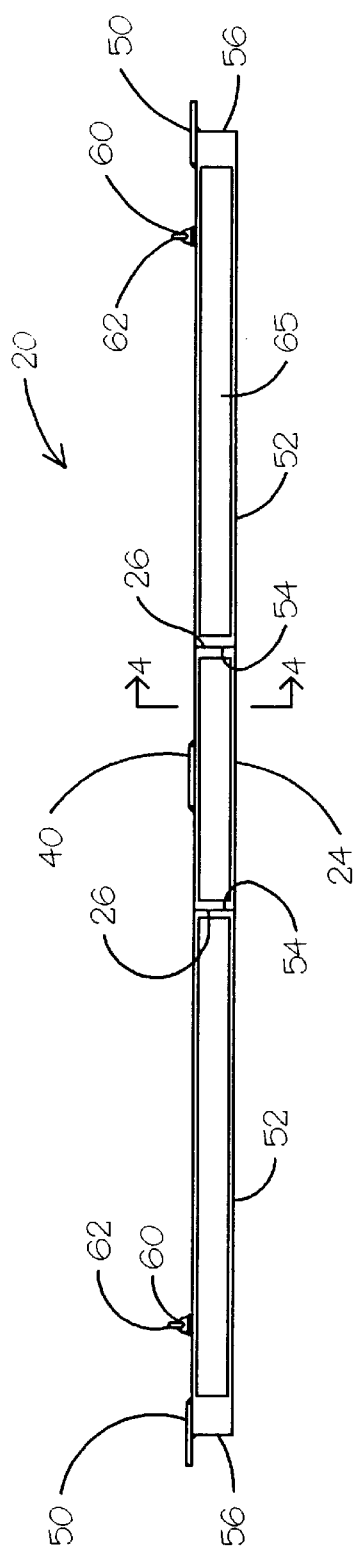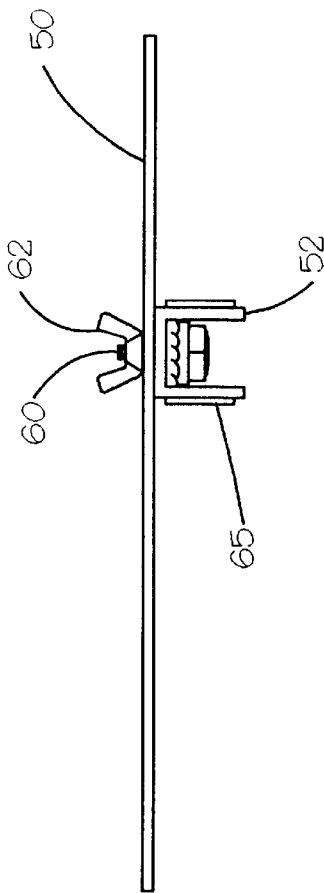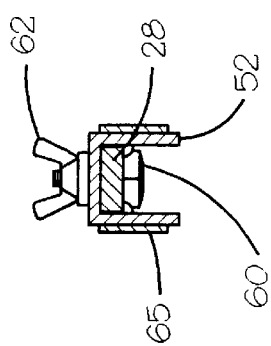
FIG. 3
FIG. 5
FIG. 4

CONSTRUCTION TOOL AND METHOD OF USE

BACKGROUND

The framing of a residential house with a pitched roof presents several problems well known to carpenters. One of these problems occurs in framing the end or gable of a pitched roof where vertical studs extend upwardly from a horizontal sill plate to the inclined rafter boards. Before assembling the studs with the sill and the rafters, both the sill and the rafters must be marked with lines indicating where each stud must be nailed in order for the stud to be perfectly plumb in its attachment between the sill and the rafter.

To accomplish this measuring and marking task in the past, a carpenter might use a common tape measure or perhaps a layout tool, or layout stick as it is commonly called, such as disclosed in the U.S. Pat. No. 3,169,320 to Currie. The layout tool of this patent has an elongated flat header plate and a plurality of shorter, flat branch plates. The branch plates are integral with the header plate, are spaced therealong, and extend outwardly from the header plate at right angles thereto. The discloses branch plates are at various spacings, specifically sixteen inches, twenty-four inches, thirty-two inches, and forty-eight inches from the endmost branch plate.

More commonly, the layout stick that is commercially available and used by many carpenters has these branch plates equally spaced along the header plate on either sixteen inch centers or twenty-four inch centers since these are the most common spacings of studs in residential construction. In any case, the branch plates of known layout sticks are integral with and in fixed space relation along the header plate.

In use of this well known layout stick, the carpenter first places the stick on the sill and marks it with lines indicating where the studs are to be nailed. Insofar as the rafters are concerned, however, the tool loses its utility since the stud marks on the rafter cannot be spaced the same distance apart as the marks on the sill. As will be understood, because of the rise of the roof, the spacing between adjacent studs as measured along the rafter, i.e. the hypotenuse of the triangle, will be slightly greater than the spacing between adjacent studs as measured along the sill, i.e. the base of the triangle. For example, if the studs are spaced along the sill on sixteen inch centers, and if for example the rise of the roof is three inches, the studs must be spaced along the rafter on sixteen and one eighth inch centers. The carpenter must therefor calculate this difference and then use another tool, i.e., a tape measure, to mark the rafters. Apart from the inconvenience, this procedure is prone to error in having to make a calculation after marking the sill and then in having to use a different tool to mark the rafters.

SUMMARY

A construction tool and method for its use in laying out stud marks are provided. The tool is adjustable and is especially suited for laying out stud marks on a rafter of a pitched roof so as to be aligned with the corresponding stud marks on a sill beneath the rafter. The tool includes an elongated measuring member; stud-marking members attached to the measuring member in spaced, transverse relation therealong, at least one of the marking members being adjustable along the measuring member; measurement indicia on the measuring member that enables the spacing between the marking members to be set; and conversion indicia on one or more of the members that sets forth the relationship among various roof rises and stud spacings on sills and rafters. The method involves laying out markings on the sill and rafter boards with the tool including the steps of placing the layout tool along a first of the boards, e.g., either a sill or a rafter, with the marking members in a first predetermined spaced relation to each other depending on the desired spacing between marks to be made along the first board; marking the first board with marks at the locations of each of the marking members; adjusting the spacing between the marking members to a second predetermined spaced relation to each other depending on the desired spacing between marks to be made along the second board; and marking the second board, e.g., either the sill or the rafter depending on which board was first marked. with marks at the adjusted locations of each of the marking members.

An object of this invention is to provide an adjustable layout tool and a method for its use in laying out stud marks in a building construction.

Another object is to facilitate laying out stud marks on sills and rafters of a building with a pitched roof.

An additional object is to minimize the time required to layout stud marks on sill and rafter boards and other construction elements.

A further object is to provide a single adjustable tool for making stud marks on inclined rafters that match corresponding stud marks on the sill under the rafters.

Another object is to provide a single tool for measuring and marking sill and rafter boards that allows either board to be marked first and that is quickly adjustable to mark the other board second.

An additional object is to enable sills and rafters and other construction elements to be simultaneously laid out by using different adjustable layout tools as provided by the subject invention, each tool being adjusted for the specific measurements required.

Yet another object is to reduce error in making stud marks on the rafters of a pitched roof so that they exactly match corresponding stud marks on the sill from which the studs extend upwardly to the rafters.

An additional object is to provide a tool that can easily be adjusted for making stud marks on the rafters of a pitched roof after having made stud marks on a sill so that the marks on the rafters will match those on the sill and so that the studs that support the rafters from the sill will be perfectly plumb.

Still another object is to facilitate the adjustment of a layout tool for making matched stud marks on a sill and rafters of a pitched roof in accordance with the rise of the roof.

A still further object is to provide an adjustable layout tool for laying out stud marks that is durable in construction, dependable to use, economical to manufacture, and compatible with tools commonly used by carpenters for the intended purposes.

A feature of the subject tool is that it is magnetically attracted to the steel framing members to facilitate its use in marking stud locations.

These and other objects, features and advantages of the present invention will become apparent upon reference to the following description, accompanying drawings, and appended claims.

DESCRIPTION OF THE DRAWINGS

FIG. 3 is a side elevation of the tool shown in FIG. 1, looking at the tool as if it were rotated ninety degrees on its longitudinal axis from the position shown in FIG. 1.

FIG. 4 is a somewhat enlarged transverse section taken on line 4—4 in FIG. 3.

FIG. 5 is a somewhat enlarged end elevation of the subject tool looking at the tool from the right end of either FIG. 1, 2 or 3.

DETAILED DESCRIPTION

Figure 1:
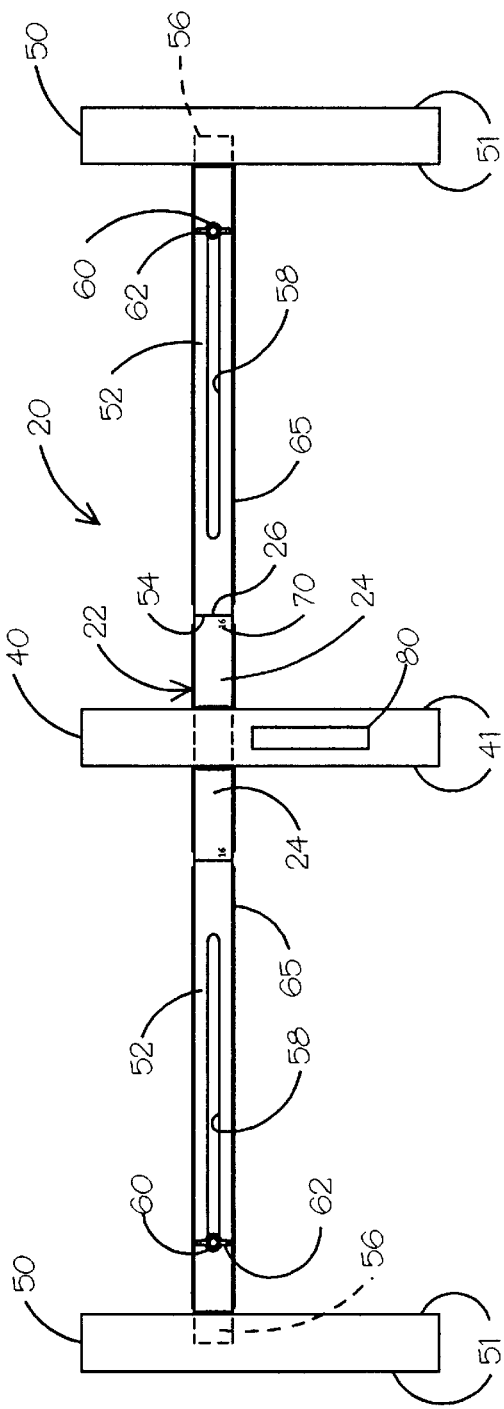
FIG. 1 is a plan view of the adjustable layout tool of the present invention shown in its retracted or closed position.
Figure 2:
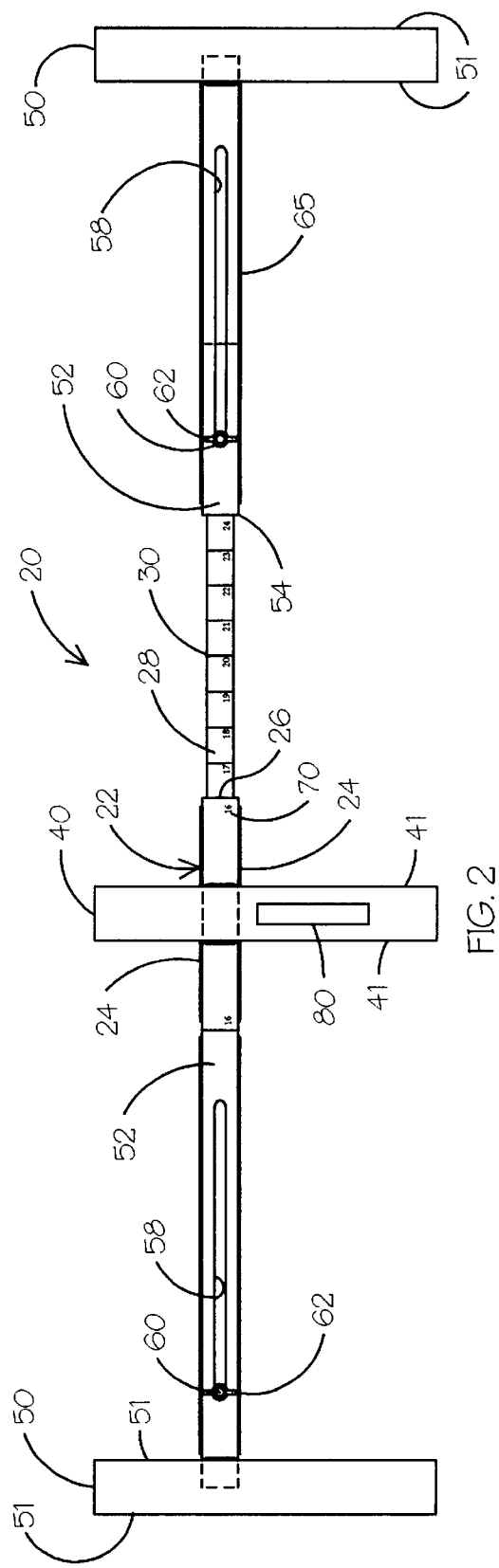
FIG. 2 is a plan view of the adjustable layout tool shown in FIG. 1 but with one of the end stud-marking arms in its fully extended or open position.

With reference to FIGS. 1, 2, and 3, the adjustable layout tool or stick is generally identified by the number 20. The tool is preferably made of metal, such as aluminum, but may be made of other materials such as a durable hard plastic. The tool includes a elongated measuring bar 22 having a center portion 24 that is channel-shaped in cross section, as shown in FIGS. 4 and 5, and terminates in opposite end edges 26. The measuring bar also includes opposite end portions 28 of flat stock that extend endwardly from the end edges of the center potion and are of a somewhat reduced width as compared with the width of the center portion. A measurement indicia or scale 30, such as an English measurement scale with inch markings, is placed on the top face of each end portion 28, as shown on the right side of the tool in FIGS. 2 and 6. A metric scale could equally as well be used. It will be understood that the left end portion 28, not fully shown in FIGS. 1 and 2, is of the same width dimension and has the same measurement indicia or scale as the right end portion shown in FIG. 2. This measurement indicia or scale will be described in more detail as the description proceeds, but it is here noted that the indicia or scale 30 as well as the other indicia set forth below may be applied to the tool 20 in various ways not involved with the present invention, that is, by inscribing or etching into the metal, by adhesive label, by imprinting or engraving, or by any other suitable method.

The subject tool 20 (FIGS. 1, 2, 3, and 5) also includes a center stud-marking arm 40 of flat stock, as best seen in FIG. 3. The center stud-marking arm is preferably welded to the center portion 24 of the measuring bar 22 equidistantly between the end edges 26 and in right angular relationship to the center portion. Alternatively but less desirably, the center arm could be fastened to the center portion with suitable fasteners. Moreover, although a fixed right angular relationship between the center arm and the center portion is preferred, the connection between this arm and center portion might be adjustable as by a pivoted connection with a fastener to fix its position, although this is also less desirable. As shown in FIGS. 1 and 2, the center arm has longer and shorter wings that extend in both directions from the center portion, the longer wing being about twice the length of the shorter wing. Furthermore, the center stud-marking arm has straight edges 41 that are in right angular relationship to the center portion of the measuring bar 22. The reason for these different dimensions will be subsequently explained.

The tool 20 also includes end stud-marking arms 50 (FIGS. 1–3, 5 and 6) of flat stock and of the same size and shape as the center arm 40. Elongated channel-shaped mounting bars 52 connect the end stud-marking arms 50 to the measuring bar in a manner and relationship to be described. More specifically, the mounting bars have the same channel-shaped cross-section as the center portions 24 of the measuring bar 22 and have flanges spaced apart slightly greater than the width of the end portions 28. The mounting bars individually telescopically fit over the end portions 28 of the measuring bar so that the webs of the mounting bars slidably overlay the measurement indicia 30 on the top faces of the end portions 28 and so that the flanges of the bars slidably embrace the sides of the end portions 28. As such, the mounting bars have end edges 54, that are in opposed relation to the end edges 26 of the center portions 24, and outer mounting ends 56.

The end stud-marking arms 50 (FIGS. 1–3, 5 and 6) are individually secured, preferably by welding, to the outer ends 56 of the mounting bars 52 and in right angular relationship to their respective mounting bars and thus to the measuring bar 22 as assembled. Alternatively but less desirably, each end arm could be fastened to the end of its bar with suitable fasteners, as described with the center arm 40 and the center portion 24. Again, although a fixed right angular relationship between each end arm and its mounting bar is preferred, the connection between each arm and bar might be adjustable, such as by a pivoted connector with a fastener to fix its position, although this is also less desirable. Each end marking arm is structurally identical to the center marking arm and is mounted on the mounting bar in spaced, parallel, coplanar relation with the center arm and so that each end arm has longer and shorter wings that extend in both directions from the center portion, in the same directions and with the same lengths as the center marking arm. Furthermore, each end stud-marking arm has straight edges 51 that are in right angular relationship to the measuring and mounting bars and parallel to the straight edges 41.

In addition, each marking arm 40 and 50 (FIGS. 1 and 2) has a width equal to the narrower width of the cross section of the typical stud or framing member used in building construction in the United States, namely, a two-by-four, so that in the disclosed embodiment, this width is nominally two inches, although slightly less to correspond with finished lumber. Further, as mentioned, each marking arm has longer and shorter wings. The lengths of these wings correspond respectively to the wider and narrower dimensions of the cross section of the studs typically used. The invention is, of course, not limited to the particular dimensions or measurement system set forth above, and such dimensions may be adjusted to suit the framing member for which the marking is being made. The principle of having the marking members sized to fit the framing member on which the tool 20 is mostly to be used is incorporated in the preferred embodiment of this invention.

Each mounting bar 52 (FIGS. 1 and 2) is of substantially the same length as its respective end portion 28 of the measuring bar 22. Thus when the end edge 26 of each center portion 24 and the end edge 54 of its adjacent mounting bar 52 are in engagement, the extreme outer end of the corresponding end portion 28 is coterminus with its adjacent outer end 56 of the mounting bar. The web of each mounting bar has an elongated slot 58 that extends longitudinally of its mounting bar throughout a substantial length thereof and that overlies the top face of its associated end portion. Bolts 60 are secured to the top faces of the end portions 28 of the measuring bar 22 and have threaded shanks extending outwardly from the bar and through the slots. Wing nuts 62 are threaded on the shanks of the bolts and are threadable down into tight engagement with the webs of the mounting bars 52 so that the mounting bars can be held in the selected positions along the measuring bar to which they are adjusted.

Furthermore, a magnetic strip 65 (FIGS. 1–5) is applied to the outside surfaces of the flanges of the center portions 24 of the measuring bar 22 and the flanges of the mounting bars 52. In this way, when the tool 20 is used on steel studs, rafters, or other framing members, the tool will be attracted to and lay flat against the framing member and insure more reliable markings.

It will thus be understood that each mounting bar 52 (FIGS. 1 and 2) is telescopically, slidably adjustably attached to its respective end portion 28 of the measuring bar 22 for movement between a closed or retracted position (FIG. 1), with the adjacent end edges 26 and 54 in engagement, and a plurality of open or extended positions, one of which is shown in FIG. 2, wherein said adjacent end edges are in spaced relation to each other. Each mounting bar is movably adjustable independently of the other mounting bar, although in typical use both mounting bars are both adjusted inwardly by the same distance, or both adjusted outwardly by the same distance, as will be seen. In order to adjust the mounting bars on the measuring bar, the wing nuts 62 are loosened to permit the described sliding action. When the mounting bar or bars are in their desired closed or opened position, the corresponding wing nut or nuts are tightened thereby securing the mounting bar or bars in the desired positions. In general, it will be understood that adjustment of the mounting bars on the measuring bar effects an adjustment of the spacing between the center stud-marking arm 40 and the end stud marking arm or arms 50 in a manner to be more fully described hereinafter.

The center-to-center spacing (FIGS. 2 and 6) between the center arm 40 and either end arm 50 is indicated by the inch marking on the measurement scale 30 that is aligned with the end edge 54 of the respective mounting bar. When the mounting bars 52 are in their completely closed positions, as shown in FIG. 1, the spacing between the center arm and each end arm is the same and this spacing is shown by tool size indicia 70, a single number, preferably located in two places on the center portion 24, that is, adjacent to each end edge 26. This number indicates the common, or at least the desired, center-to-center spacing between adjacent studs along the sill of a building. This number also indicates the minimum center to center spacing between adjacent marking arms of the tool 20. As is well known the typical spacing between adjacent studs along the sill in US residential building construction is sixteen inches on center. Accordingly, in the disclosed preferred embodiment of the subject tool, the number "16" appears as the indicia 70, and the size of the tool is a No. 16 for a sill stud spacing of sixteen inches on-center.

Moreover, the end edges 26 (FIGS. 2 and 6) and their indicia 70 are parts of the scales 30 in that the minimum spacing between each end and and the center arm is indicated by the indicia 70, whereas greater spacings are indicated by the respective scale 30. In other words, each end edge 26 is the minimum inch marking on its corresponding scale 30. That is, each scale 30 actually begins with each end edge 26 and continues from left to right on the right side of the tool and from right to left on the left side of the tool, as the tool is seen in FIG. 2. Thus, since the disclosed embodiment is a sixteen inch tool, each scale starts with inch markings representing sixteen inches and continues with major inch markings at "17", followed by "18", "19", "20", and so on to "24", from left to right at the right end of the tool and from right to left at the left end of the tool, as seen in FIG. 2. When the end edge 54 is at "17", for example, the center-to-center spacing between adjacent stud-marking arms is 40, 50 is 17", that is, one inch greater than in the closed position, and so on at each inch marking as the mounting bars 52 are moved outwardly on the end portions 28. In between major inch markings, of course, the scale is divided in the same manner as a typical carpenter's rule or ruler so that wherever the end edge 54 is placed, the scale reads the center-to-center distance between the corresponding end arm and the center arm. Of course and as mentioned, although the English system is shown as the indicia, the metric system could be used. Moreover, the exact number of fractional divisions between the major measurement markings is optional and may be varied as desired.

Figure 6:
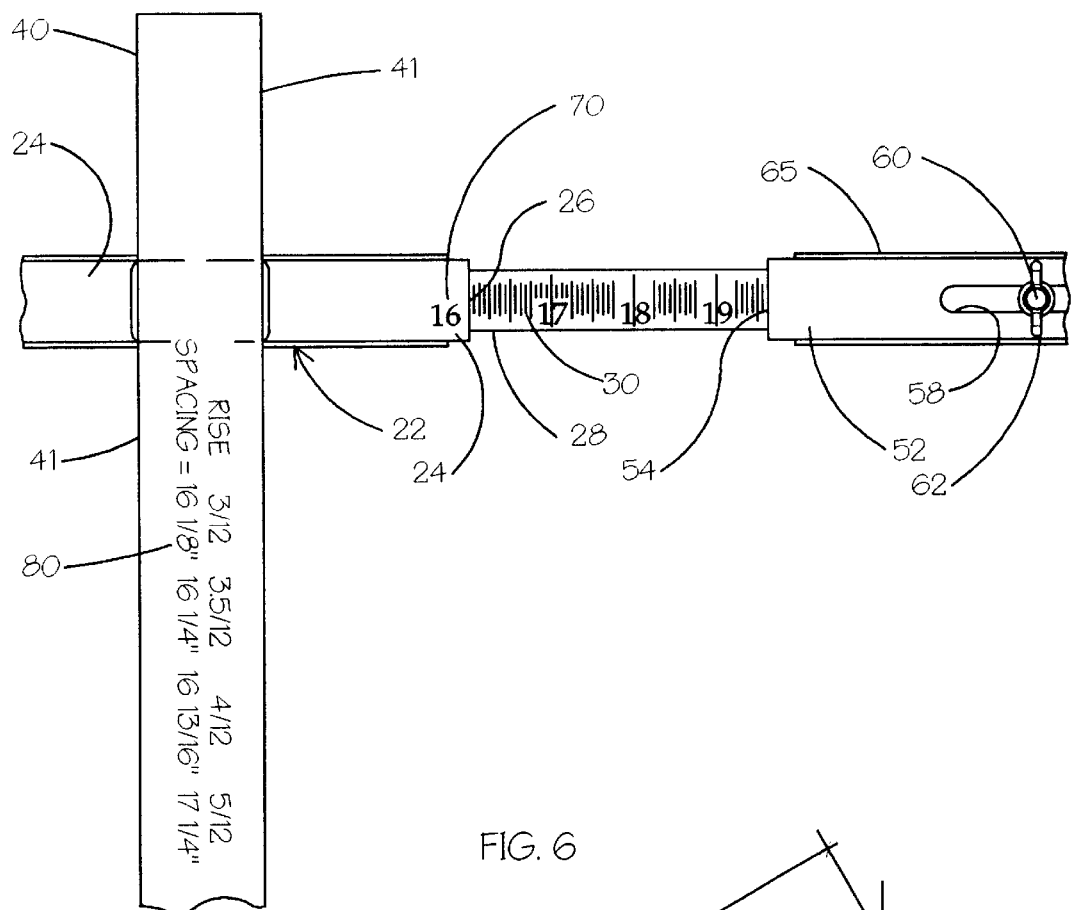
FIG. 6 is a somewhat enlarged fragmentary plan view of the central portion of the subject tool showing the one of the end stud-marking arms in a partially extended or open position and also showing measurement indicia on the measuring bar and conversion indicia on the center stud-marking arm.

The subject layout tool 20 (FIGS. 1, 2 and 6) also includes indicia 80 in the form of a conversion table preferably appearing on the center portion 24 of the measuring bar 22. Because of the small scale of FIGS. 1 and 2, this table is generally represented by a rectangle just to indicate its position. On the other hand, FIG. 6 shows the conversion table in full detail. This table shows the relationship between various rises of a pitched roof and the center-to-center spacing between stud markings on the rafters of such a roof for a given on-center stud spacing on the corresponding sill.

Figure 7:
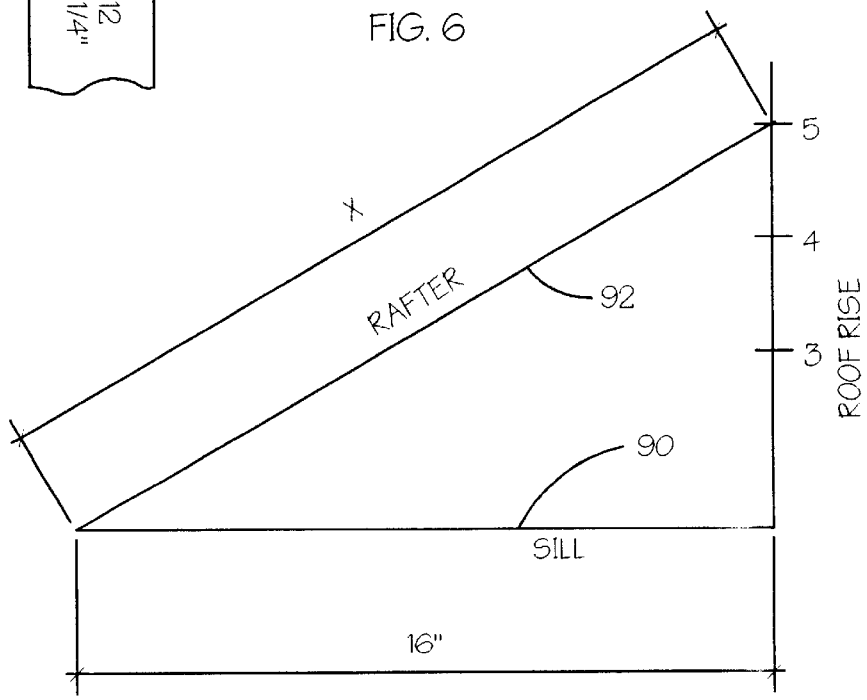
FIG. 7 is a diagram giving an example of sill rafter, and roof rise relationships set forth in the conversion indicia shown in FIG. 6.
Figure 8:
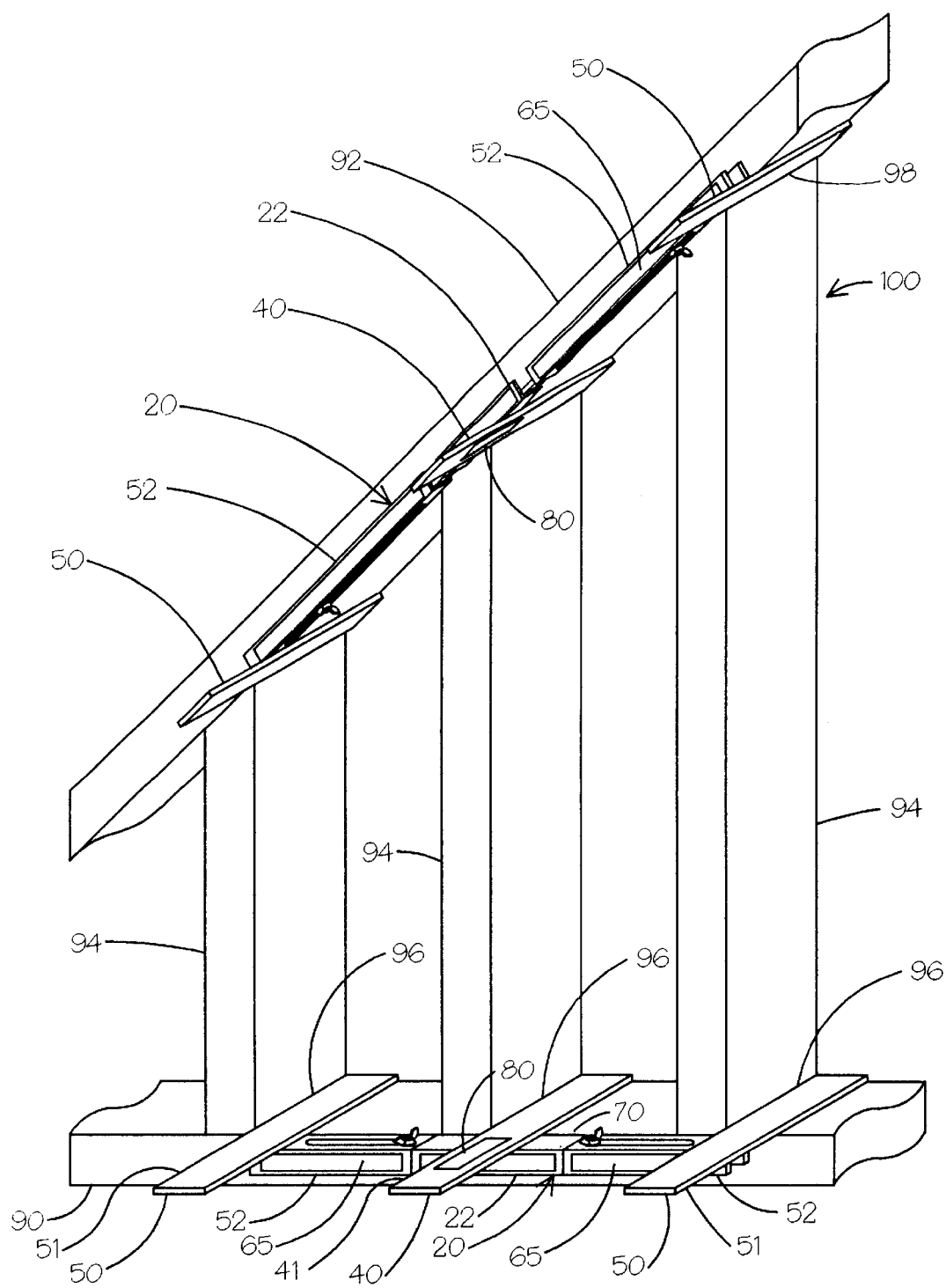
FIG. 8 is an isometric view of a sill and rafter and interconnecting studs in a building construction and showing how the subject adustable layout tool is positioned for making stud marks along the sill and rafter.

For a more detailed explanation of this conversion table 80 (FIG. 6), reference is also made to FIGS. 7 and 8 where a sill is indicated by the number 90, a rafter by the number 92, and vertical studs by the number 94. In order for the studs to be erected in perfectly plumbed, vertical positions, as shown in FIG. 8, the center-to-center stud spacing on the rafter must be slightly greater than the center-to-center stud spacing on the sill. This relationship is a matter of triangulation as shown in FIG. 7. As there illustrated, if the stud spacing on the sill is 16" on-center, for example, the stud spacing on the rafter will be X" on-center depending on the rise of the roof. As shown in FIG. 7, for a roof rise of 5, meaning five inches over a span of twelve inches, the stud spacing along the rafter, or X, equals 17¼" on-center.

Since the conversion table 80 (FIGS. 6, 7 and 8) shows the relationship among rafter stud spacing and roof rise for a given sill stud spacing, the table is different for different sizes of tools 20. In the preferred embodiment shown and described, the tool is a No. 16, thereby indicating a sill stud spacing of sixteen inches on-center, so the table 80 provides the correct rafter stud spacings for common roof rises for sixteen inch sill stud spacings. If the tool is for a different sill stud spacing, such as for example twenty-four inches on-center, then the scale 30 as well as the dimensions set forth in the conversion table 80 will be different from that illustrated in FIG. 6 and be related to the particular sill stud spacing of twenty-four inches on-center. Alternatively, the tool could be for multiple sizes, for example, a No. 16/24, and be supplied with multiple conversion tables, for example, one for sixteen inches on-center and one for twenty-four inches on-center, with the table 30 accommodating sill and rafter measurements for both sixteen inches and twenty four inches on center.

DESCRIPTION OF THE METHOD AND USE OF THE TOOL

The method of using the subject adjustable layout tool 20 for making markings on a sill 90 and rafter 92 of a building under construction or remodel is now described, with particular reference to FIGS. 6–8. For illustrative convenience, FIG. 8 is a combined figure intended to illustrate several different stages of the subject method both for new construction and remodeling. The figure shows both the erected finished assembly of a sill, rafter and studs and two of the subject tools in place. In contrast, especially for new construction, the subject tool would be used on the ground on the individual sill and rafter before these framing members are assembled with the studs, since the very purpose of the tool is to facilitate such assembly. For a remodel job, however, the tool may be used in more of the setting and manner shown in FIG. 8.

Assuming that the sill 90 (FIG. 8) is to be marked first for studs 94 at sixteen inches on center, the tool 20 is adjusted to its retracted position, as shown in FIGS. 1, 3, and 8, and the wing-nuts 62 are tightened so that adjacent marking arms 40 and 50 are sixteen inches apart, center-to-center to use the specific example shown in the drawings. The tool is then placed along the sill, as shown in FIG. 8, so that the measuring bar 22 is along and in engagement with the side of the sill and so that the stud-marking arms 40 and 50 are lying on top of the sill. The longer wings of the marking arms overlay and extend the full width of the wider dimension of the sill. It will of course be understood that the tool is placed at one end of the sill at the location where the initial stud-markings are to be made. Stud marks, as indicated at 96, are then scribed along both straight edges 41 of each marking arm on the sill thereby marking the outlines of the exact locations on the sill where the studs are to be placed and nailed. The tool is then picked up and moved to the next successive location and positioned against the sill in the same manner as shown in FIG. 8 and as described above, whereupon the successive stud marks are made along the straight edges 41. In this manner, the tool is moved along the sill until stud marks have been made throughout as much of the length of the sill as is desired.

After the sill 90 (FIG. 8) has been marked with stud marks 96, the tool is adjusted for marking the rafter 92. For this purpose, reference is made to the conversion table 80 (FIG. 6) to determine what spacing is to be used between the studs 94 on the rafter for the particular roof involved. Assuming that the roof rise is known to be 5, the table shows that the rafter stud spacing must be 17¼", so both wing nuts 62 (FIGS. 1, 2 and 6) are loosened and both mounting bars 52 are slid outwardly on the end portions 28 until the end edges 54 are aligned with the 17¼" markings on the respective scales 30 whereby adjacent marking arms 40 and 50 are now 17¼" apart center-to-center. The wing nuts 62 are then tightened so as to secure the mounting bars in their adjusted positions.

The tool 20 (FIG. 8) is then laid on the rafter 92 in the same manner as described above with regard to the sill 90. Although the tool is shown in FIG. 8 upside down and against the rafter of an existing structure, it will be understood, as explained above, that for new construction, the rafter at this point is unassembled and still on the ground. Thus, for new construction, the rafter and tool of FIG. 8 should be visualized as inverted and in a horizontal attitude for marking purposes. For a remodel, however, the rafter and tool would be used as shown in FIG. 8, albeit without the studs 94 in place. Regardless of the orientation, the rafter is marked with lines such as at 98 along each marking edge 41 and 51, just like the sill 90 as described above, except that now the tool has been adjusted to mark the stud locations at the exact spacing required on the rafter consistent with the sill markings and the roof rise.

After the sill 90 and rafter 92 (FIG. 8) have been marked with the stud marks 96 and 98, the wall section, as 100, can be assembled with the studs 94 extending between sill and the rafter. The studs are placed within corresponding marks made on the sill and the rafter and are nailed in place. When the wall is erected, the studs will be vertical and in perfectly plumbed relationship since with the subject tool 20, the corresponding stud marks have been precisely made on both the sill and the rafter.

From the foregoing it will be understood that an adjustable layout tool and method have been shown and described that have several advantages. The tool and method facilitate laying out stud marks on sills and rafters of a building with a pitched roof while minimizing the time and tools to accomplish the task and while insuring greater accuracy of the stud locations. Because of its adjustability and ease of calculating stud spacings, either the sill or the rafter board can be marked first and the other marked second after quickly adjusting the tool so that the marks on the second board match the marks on the first board. Alternatively, the sills and rafters and other construction elements can be simultaneously laid out by using different adjustable layout tools, each tool being adjusted for the specific measurements required. In addition, the adjustable layout tool for laying out stud marks is durable in construction, dependable to use, economical to manufacture, and compatible with tools commonly used by carpenters for the intended purposes. Furthermore, when working with steel sills and rafters, the tool is magnetically attracted to the framing member to facilitate its use.

Although a preferred embodiment of the present invention has been shown and described, various modifications, substitutions and equivalents may be used therein without departing from the spirit and scope of the invention. Accordingly, it is to be understood that the present invention has been described by way of illustration and not limitation.

What is claimed is:

1. An adjustable tool for laying out stud marks on the rafter of a pitched roof and the sill beneath the rafter so that the marks on the rafter for each stud are vertically aligned with the corresponding stud marks for that stud on the sill, wherein the stud marks on the sill are at a predetermined center-to-center spacing and the stud marks on the rafter are at a center-to-center spacing greater than said predetermined spacing, comprising:

an elongated measuring member;

measurement gradations on the measuring member in a range of dimensions that begin with a predetermined minimum dimension representative of the center-to-center spacing of the stud marks on a sill and continue with greater dimensions representative of the center-to-center spacing of the stud marks on a rafter;

first and second stud-marking members mounted on the measuring member in longitudinally spaced relation therealong and extending transversely outwardly therefrom, the second marking member being mounted for movement lengthwise of the measuring member toward and away from the first marking member between a retracted stop position of minimum center-to-center spacing between the marking members equal to said predetermined minimum dimension and extended positions of greater center-to-center spacing between the marking members including said greater dimensions;

an indicator associated with the second marking member registering with the gradations and indicating the spacing between the marking members at the positions of the second marking member; and conversion indicia that displays, for various roof pitches and said predetermined center-to-center spacing on the sill, the center-to-center spacing of the stud marks on the rafter that enables said vertical alignment of corresponding stud marks on the sill and rafter.

2. The tool of claim 1, wherein a fastener interconnects the second marking member and the measuring member and is adapted to retain the second marking member in fixed relation to the first marking member.

3. The tool of claim 1, wherein the measuring member has opposite end portions;

wherein the first stud-marking member is a center marking member fixed to the measuring member intermediate the end portions thereof;

wherein there are a pair of second stud-marking members connected to the measuring member at opposite ends of the center marking member;

wherein the measurement gradations are on the measuring member on each side of the center marking member between the center marking member and the respective second marking members; and wherein there are a pair of indicators individually associated with the second marking members and individually registering with the gradations on its side of the center marking member.

4. The tool of claim 3, wherein there are mounting members individually connected to the second marking members and slideably connected to said opposite end portions of the measuring member; and wherein each mounting member has an end edge constituting the indicator on its side of the center marking member and alienable with the measurement gradations on its side of the center marking member to indicate the spacing between the center marking member and the respective second marking member.

5. The tool of claim 4, wherein the measuring member has a center portion that has a predetermined width and that has opposite end edges;

wherein the opposite end portions extend endwardly from the end edges of the center portion and have widths less than the center portion;

wherein the mounting members are slideably attached to said opposite end portions with the end edges of each mounting member being opposed to the end edge of the adjacent opposite end portion, the end edge of each mounting member being thereby movable between said retracted position with said opposed end edges being in engagement and said extended positions with said opposed end edges in spaced relation, the spacing between the center marker member and each second marker member being equal to said predetermined center-to-center spacing when the corresponding opposed end edges are in said retracted position.

6. The tool of claim 1, wherein the conversion indicia is on one of the members.

7. A tool for laying out stud marks on the sill and rafter of a building having a pitched roof so that stud marks can be marked on the sill and rafter, so that the stud marks on the rafter will be vertically aligned with corresponding stud marks on the sill, and so that studs can be fastened to the sill and rafter at the locations of corresponding vertically aligned stud markings and thereby be in vertical positions, the stud marks on the sill being at a predetermined center-to-center spacing and the stud marks on the rafter being at a center-to-center spacing greater than said predetermined spacing, comprising:

an elongated measuring bar having oppositely extending center portions and opposite end portions extending from the center portions, the end portions being of reduced width relative to the center portions and terminating in end edges;

measurement markings on the end portions of the measuring bar;

a center stud-marking arm attached to the measuring bar in right-angular relation thereto and midway between said opposite end portions;

elongated mounting bars telescopically adjustable slideably attached to the opposite end portions of the measuring bar and being of a width corresponding to the width of the center portions, each mounting bar having an end edge in right angular relation to the opposite end portions of the measuring bar and in opposed relation to its respectively adjacent end edge thereof, each mounting bar being movable from a retracted position with its end edge in engagement with its adjacent end edge of the measuring bar and extended positions with its end edge in spaced relation to its adjacent end edge of the measuring bar;

end stud-marking arms individually attached to the mounting bars in parallel relation to and on opposite sides of the center stud-marking arm and being thereby adjustably mounted on the measuring bar, the marking arms extending outwardly substantially the same distance from the measuring bar, the center-to-center spacing between each end marking bar and the center bar being representative of said predetermined center-to-center spacing when the end edge of its respective mounting bar is in said retracted position;

fasteners releasably interconnecting corresponding end marking arms and opposite end portions of the measuring bar so that the end marking arms can be maintained in predetermined spaced relation to the center stud-marking arm;

a table on one of the arms and the measuring bar that sets forth the relationship among various roof rises and stud spacings on sills and rafters for a given sill stud spacing; and an indication on one of the arms and the measuring bar that sets forth said sill stud spacing.

8. The tool of claim 7, wherein each fastener is a bolt extending through each attached mounting bar and opposite end portion and a wing nut on the bolt.

9. The tool of claim 8, wherein each mounting bar has in elongated slot;

wherein the bolts are secured to opposite end portions of the measuring bar and extend through their respective slots; and wherein the wing nuts are tightenable against the mounting bars to secure the mounting bars and their respective end stud-marking arms in selected spaced relation to the center stud-marking arms.

10. The tool of claim 9, wherein a magnetic strip is on one of the bars.

11. A method of laying out stud marks on the sill and rafter boards for a pitched roof using an adjustable layout tool having at least a pair of transverse marking arms attached to a longitudinal measuring bar wherein one of the marking arms is adjustable along the measuring bar relative to the other marking arm, comprising the steps of:

placing the layout tool along a first of the boards with the marking arms in a first predetermined spaced relation to each other depending on the desired spacing between marks to be made along the first board;

marking the first board with marks at the locations of each of the marking arms;

adjusting the spacing between the marking arms to a second predetermined spaced relation to each other depending on the desired spacing between marks to be made along the second board;

placing the layout tool along a second of the boards with the marking arms in said second predetermined spaced relation to each other; and marking the second board with marks at the adjusted locations of each of the marking arms.

12. The method of claim 11, wherein the layout tool has a table that gives the required spacing between the stud marks on a rafter of a particular rise corresponding to the stud spacing on a sill, further including the steps of:

prior to said adjusting step, determining from the table the required spacing between the stud marks on the second board for the rise of the rafters of the building.

13. The method of claim 11, wherein the first board to be marked is the sill and the second board to be marked is the rafter.

14. The method of claim 11, wherein the tool used has indicia thereon for a particular spacing between studs on a sill and wherein the layout tool has a table that gives the required spacing between the stud marks on a rafter of a particular rise corresponding to said particular stud spacing, further including the steps of:

marking the sill before the rafter; and determining from the table the required spacing between the stud marks on the rafter for the rise of the rafters of the building before marking the rafter.

15. The method of claim 11, wherein the tool has a fixed center marking arm and a pair of end marking arms whose spacing from the center arm can be adjusted and releasably secured in the adjusted positions, further including the steps of:

initially adjusting the end marking arms along the measuring bar to the same spacing from the center marking arm in accordance with the spacing of studs on one of the boards;

securing the end marking arms in said adjusted positions;

placing the tool along a first of the boards;

making stud marks along the first board at each of the marking arms;

releasing the end marking arms from their initially adjusted positions;

readjusting the end marker arms along the measuring bar to the spacing from the center marking arm for the spacing of studs on the other of the boards;

securing the end marking arms in their readjusted positions;

placing the tool along a second of the boards; and making stud marks along the second board at each of the marking arms.

16. The method of claim 15 wherein there is conversion data that gives the required spacing between the stud marks on a rafter of a particular rise corresponding to said particular stud spacing, further including the step of:

determining from the data required spacing for each of the boards.

17. The method of claim 16 wherein the data is on one of the bar and the arms, further including the steps of:

referring to the data prior to adjusting the end marking arms and determining from the data the spacing to be set between the marking arms for the stud marks on the rafter relative to the spacing between the stud marks on the sill.

18. The method of claim 11, wherein the layout tool used has indicia thereon for a particular spacing between studs on a sill, wherein the layout tool has a table that gives the required spacing between the stud marks on a rafter of a particular rise corresponding to said particular stud spacing, and wherein the tool has a fixed center marking arm and a pair of end marking arms whose spacing from the center arm can be adjusted and releasably secured in the adjusted positions, further including the steps of:

initially adjusting the end marking arms along the measuring bar to the same spacing from the center marking arm in accordance with the spacing of studs on the sill;

securing the end marking arms in said adjusted positions;

positioning the tool along the sill;

making stud marks along the sill at each of the marking arms;

successively repositioning the tool along the sill and making stud marks along the sill at each of the marking arms until the desired number of marks is made on the sill;

releasing the end marking arms from their initially adjusted positions;

readjusting the end marker arms along the measuring bar to the spacing from the center marking arm for the spacing of studs on the rafter in accordance with the rafter spacing as provided in the table;

securing the end marking arms in their readjusted positions;

positioning the tool along the rafter;

making stud marks along the rafter at each of the marking arms; and successively repositioning the tool along the rafter and making stud marks along the rafter at each of the marking arms until the desired number of marks is made on the rafter.

19. A tool for laying out stud marks on construction elements intended for use as the sill and the rafter of a structure having a pitched roof so that corresponding stud marks on the sill and rafter for a each stud are vertically aligned and so that each stud will be vertical when erected with its ends located at the corresponding vertically aligned stud marks, the stud marks on the sill to be spaced apart by a predetermined center-to-center dimension and the stud marks on the rafter to be spaced farther apart than said predetermined center-to-center dimension in order that corresponding stud marks will be vertically aligned, comprising:

an elongated measuring bar having inner and outer portions and a measuring scale providing measurement subdivisions that represent center-to-center dimensions of the stud marks on the sill and the rafter, the dubdivisions increasing in small increments of said predetermined center-to-center dimension outwardly along the measuring bar from an initial subdivision adjacent to the inner portion representing said predetermined center-to-center dimension to an outer subdivision that represents the center-to-center spacing of the stud marks on the rafter that will achieve said vertical alignment of corresponding stud marks and said vertical positioning of the studs;

an inner marking arm attached to the inner portion of the measuring bar;

a mounting member longitudinally adjustable mounted on the outer portion of the measuring bar having a measuring indicator alienable with the subdivisions on the measuring bar during such adjustment; and an outer marking arm attached to the mounting member in opposed spaced relation to the inner marking arm and movable toward and away from the inner marking arm upon longitudinal adjustment of the mounting member along the measuring bar, each of the marking arms having a pair of adjacent spaced straight edges extending outwardly from the measuring bar, and the center-to-center distance between the marking arms when the measuring indicator is aligned with the initial subdivision being representative of said predetermined center-to-center dimension and the center-to-center distance between the marking arms when the measuring indicator is aligned with said outer subdivision being representative of said center-to-center spacing of the stud marks on the rafter that will achieve said vertical alignment of corresponding stud marks and said vertical positioning of the studs.

20. The tool of claim 19, wherein the outer portion of the measuring bar is flat;

wherein the mounting member is channel-shaped, has inner and outer ends, and telescopically slideably receives flat outer portion of the measuring bar;

wherein the outer marking arm is mounted adjacent to the outer end of the mounting member; and wherein the inner and outer marking arms are coplanar.

21. The tool of claim 20, wherein the inner portion of the measuring bar is channel-shaped and wider than the outer portion thereof but of substantially the same shape as the mounting member; and wherein the inner end of the mounting member engages the inner portion of the measuring bar when the measuring indicator is aligned with the initial subdivision.

22. The tool of claim 19, wherein the tool includes:

a display surface; and a conversion table on the display surface giving the relationship between the center-to-center distances of stud marks on a sill and the center-to-center distances of stud marks on the rafter for roofs of various pitches.

23. A stool for laying out stud marks for positioning studs against construction elements intended for use as the sill and the rafter of a structure having a pitched roof so that the stud marks on the sill and rafter will be vertically aligned when the studs is erected, the stud marks on the sill to be spaced apart by a predetermined center-to-center dimension and the stud marks on the rafter to be spaced farther apart than said predetermined center-to-center dimension in order that corresponding marks will be vertically aligned, comprising:

an elongated measuring bar having a pair of outer portions extending outwardly from a center portion and measuring scales on each outer portion, each scale having measurement subdivisions on its outer portion of the bar that represent center-to-center dimensions increasing outwardly along its measuring bar form an initial subdivision representing said predetermined center-to-center dimension;

an inner marking arm attached to the center portion of the measuring bar;

a pair of mounting members individually longitudinally adjustably mounted on the outer portions of the measuring bar and thus on opposite sides of the inner marking arm, each mounting member having a measuring indicator alienable with the subdivisions on its portion of the measuring bar; and a pair of outer marking arms individually attached to the mounting members and thus on opposite sides of the inner marking arm and in opposed spaced relation to the inner marking member, each of the marking arms having a pair of adjacent spaced straight edges extending outwardly from the measuring bar, and the center-to-center distance between each outer marking arm and the inner marking arm when its respective measuring indicator is aligned with its respective initial subdivision being representative of said predetermined center-to-center dimension.

24. The tool of claim 23, wherein the outer portions of the measuring bar are flat;

wherein the mounting members are channel-shaped, have inner and outer ends, and telescopically slideably receive their respective flat outer portions of the measuring bar;

wherein the outer marking arms are mounted adjacent to the outer ends of their respective mounting members; and wherein the inner and outer marking arms are coplanar.

25. The tool of claim 24, wherein the center portion of the measuring bar is channel-shaped and wider than the outer portions thereof but of substantially the same shape as the mounting members; and wherein the inner ends of the mounting members engage the center portion of the measuring bar when their respective measuring indicators are aligned with their respective initial subdivisions.

26. The tool of claim 23, wherein the tool includes:

a display surface; and a conversion table on the display surface giving the relationship between the center-to-center distances of stud marks on a sill and the center-to-center distances of stud marks on the rafter for roofs of various pitches.

27. A method of laying out stud marks on construction boards intended for use as the sill and the rafter of a structure having a pitched roof so that corresponding stud marks on the sill and rafter for each stud are vertically aligned and so that each stud will be vertical when erected with its ends located at the corresponding vertically aligned stud marks, the stud marks on the sill to be spaced apart by a predetermined center-to-center dimension and the stud marks on the rafter to be spaced farther apart than said predetermined center-to-center dimension in order that corresponding stud marks will be vertically aligned, the method being performed with the tool defined in claim 1, comprising the steps of:

placing the measuring member along the first of the boards with the marking members overlaying the first board and in a first predetermined spaced relation to each other depending on the desired spacing between marks to be made along the first board;

marking the first board with marks at the locations of each of the marking members;

adjusting the spacing between the marking members to a second predetermined spaced relation to each other depending on the desired spacing between marks to be made along the second board;

placing the measured member along a second of the boards with the marking members overlaying the second board and in said second predetermined spaced relation; and marking the second board with marks at the adjusted locations of each of the marking members.

* * * * *